(12) United States Patent
Shi et al.

(10) Patent No.: US 10,559,935 B2
(45) Date of Patent: Feb. 11, 2020

(54) ELECTRIC MOTOR AND BRUSH THEREOF

(71) Applicant: Johnson Electric S.A., Murten (CH)

(72) Inventors: Jingxin Shi, Shenzhen (CN); Sijun Zhao, Shenzhen (CN); Luyan Bi, Shenzhen (CN); Pingman Zhang, Shenzhen (CN); Lang Dai, Shenzhen (CN); Yunchang Yu, Shenzhen (CN); Guiqing Liao, Shenzhen (CN); Xionghui Liu, Shenzhen (CN); Zhiyu Chen, Shenzhen (CN); Cong Lv, Shenzhen (CN); He Chi, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 60 days.

(21) Appl. No.: 15/820,028

(22) Filed: Nov. 21, 2017

(65) Prior Publication Data

US 2018/0166843 A1    Jun. 14, 2018

(30) Foreign Application Priority Data

Dec. 14, 2016  (CN) .......................... 2016 1 1155436

(51) Int. Cl.
*H01R 39/26* (2006.01)
*H01R 39/38* (2006.01)
*H02K 13/10* (2006.01)

(52) U.S. Cl.
CPC ........... *H01R 39/26* (2013.01); *H01R 39/381* (2013.01); *H02K 13/10* (2013.01)

(58) Field of Classification Search
CPC ........ H01R 39/20; H01R 39/26; H01R 39/18; H01R 39/381; H02K 13/10
See application file for complete search history.

(56) References Cited

U.S. PATENT DOCUMENTS

| 5,485,049 | A | * | 1/1996 | Shannon | ................ | H01R 39/26 310/248 |
| 5,909,077 | A | * | 6/1999 | Bruhn | .................... | H01R 39/26 310/248 |

(Continued)

FOREIGN PATENT DOCUMENTS

JP        2002-027711     *   1/2002  ............. H01R 39/18

OTHER PUBLICATIONS

Jp2002-027711 machine translation, Mar. 18, 2019.*

*Primary Examiner* — Mang Tin Bik Lian
*Assistant Examiner* — Leda T Pham
(74) *Attorney, Agent, or Firm* — Muncy, Geissler, Olds & Lowe, P.C.

(57) ABSTRACT

A brush used to contact with a commutator, includes a brush body which includes two opposite axial end faces and a protruding portion projecting from the brush body toward the commutator. The protruding portion includes a first surface, a second surface and at least two teeth. The first surface and the second surface are respectively adjacent to the two axial end faces. Angles formed between the first surface and the second surface and corresponding adjacent axial end faces are obtuse. The teeth is located between the first surface and the second surface, and extends generally along a circumferential direction of the commutator. The ratio of a total width of the at least two teeth in an axial direction of the brush to an axial height of the brush body is in the range of 0.25-0.75. An electric motor including the brush is also provided.

11 Claims, 5 Drawing Sheets

(56) References Cited

U.S. PATENT DOCUMENTS

| | | | |
|---|---|---|---|
| 6,787,963 B2 * | 9/2004 | Tanaka | H01R 39/20 310/248 |
| 2009/0033172 A1 * | 2/2009 | Igawa | H01R 39/26 310/248 |
| 2009/0152978 A1 * | 6/2009 | Fournier | H01R 39/18 310/248 |
| 2010/0225198 A1 * | 9/2010 | Lau | H01R 39/26 310/248 |

* cited by examiner

ELECTRIC MOTOR AND BRUSH THEREOF

CROSS REFERENCE TO RELATED APPLICATIONS

This non-provisional patent application claims priority under 35 U.S.C. § 119(a) from Patent Application No. 201611155436.3 filed in The People's Republic of China on Dec. 14, 2016.

FIELD

The present disclosure relates to electric motors, and particularly to a brush and an electric motor including the brush.

BACKGROUND

A brush for a brush motor is an electrically conductive component which slidably contacts a commutator to thereby form an electrical connection with the commutator so as to supply power to the rotor of the motor. Generally, the brush is square and mounted on a brush arm, and stays in tight contact with the commutator due to the elastic pushing force of a spring. The contact surface of a conventional brush that contacts the commutator is usually an arc surface that matches the outer surface of the commutator. In the first few times of operation of the brush motor, the contact surfaces of the brushes and the commutator may not fit well due to manufacturing tolerances and other factors, which may result vibration when the brush slides with respect to the commutator and therefore generating noise.

SUMMARY

Thus, there is a desire for a brush for a low-noise electric motor.

The present disclosure provides a brush used to contact with a commutator. The brush includes a brush body having opposite axial end faces; and a protruding portion projecting from the brush body toward the commutator. The protruding portion has a first surface, a second surface and at least two teeth. The first surface and the second surface are respectively adjacent to the axial end faces. Angles formed between the first surface and the second surface and corresponding adjacent axial end faces are obtuse. The at least two teeth are located between the first surface and the second surface, and extend generally along a circumferential direction of the commutator. The ratio of a total width of the at least two teeth in an axial direction of the brush to an axial height of the brush body is in the range of 0.25-0.75.

In one embodiment, the angle formed between the first surface and its corresponding adjacent axial end face is equal to the angel formed between the second surface and its corresponding adjacent axial end face.

In one embodiment, the angles formed between the first surface and the second surface and the corresponding adjacent axial end faces are in the range of 110°-150°.

In one embodiment, the ratio of a protruding height of the teeth relative to the first surface or the second surface to a protruding height of the protruding portion relative to the brush body is in the range of 0.15-0.6.

In one embodiment, the number of the at least two teeth is in the range of 2-5.

In one embodiment, each of the teeth has an arc-shaped top or a sharp top.

In one embodiment, the teeth are straight teeth.

In one embodiment, each of the first surface and the second surface is respectively any one of a concave surface, a planar surface and a convex surface.

In one embodiment, the brush body includes a first end and a second end opposite to the first end. The brush further includes a connecting portion. The protruding portion projects from the first end and the connecting portion projects from the second end.

The present disclosure further provides an electric motor including a housing, a commutator rotatably arranged in the housing, and a brush described above which slidably contacts with the commutator.

In one embodiment, the motor further includes a brush arm to which the brush is mounted.

In the eletric motor according to an embodiment of the present disclosure, during initial use of the motor, only the tops of the teeth contact with the commutator, which results in low noise generated due to the brushes sliding with respect to the commutator. With continuous wearing between the the commutator and the teeth, the teeth are worn out and the first surface and the second surface of the protruding portion start to contact with the commutator. The contact area between the brushes and the commutator increases gradually to thereby avoid that the contact area between the brush and the commutator changes sharply.

DETAILED DESCRIPTION OF THE PREFERRED EMBODIMENTS

Embodiments of the present disclosure will be described in detail in conjunction with the drawings. It should be noted that the figures are illustrative rather than limiting. The figures are not drawn to scale, do not illustrate every aspect of the described embodiments, and do not limit the scope of the present disclosure.

Figure 1:
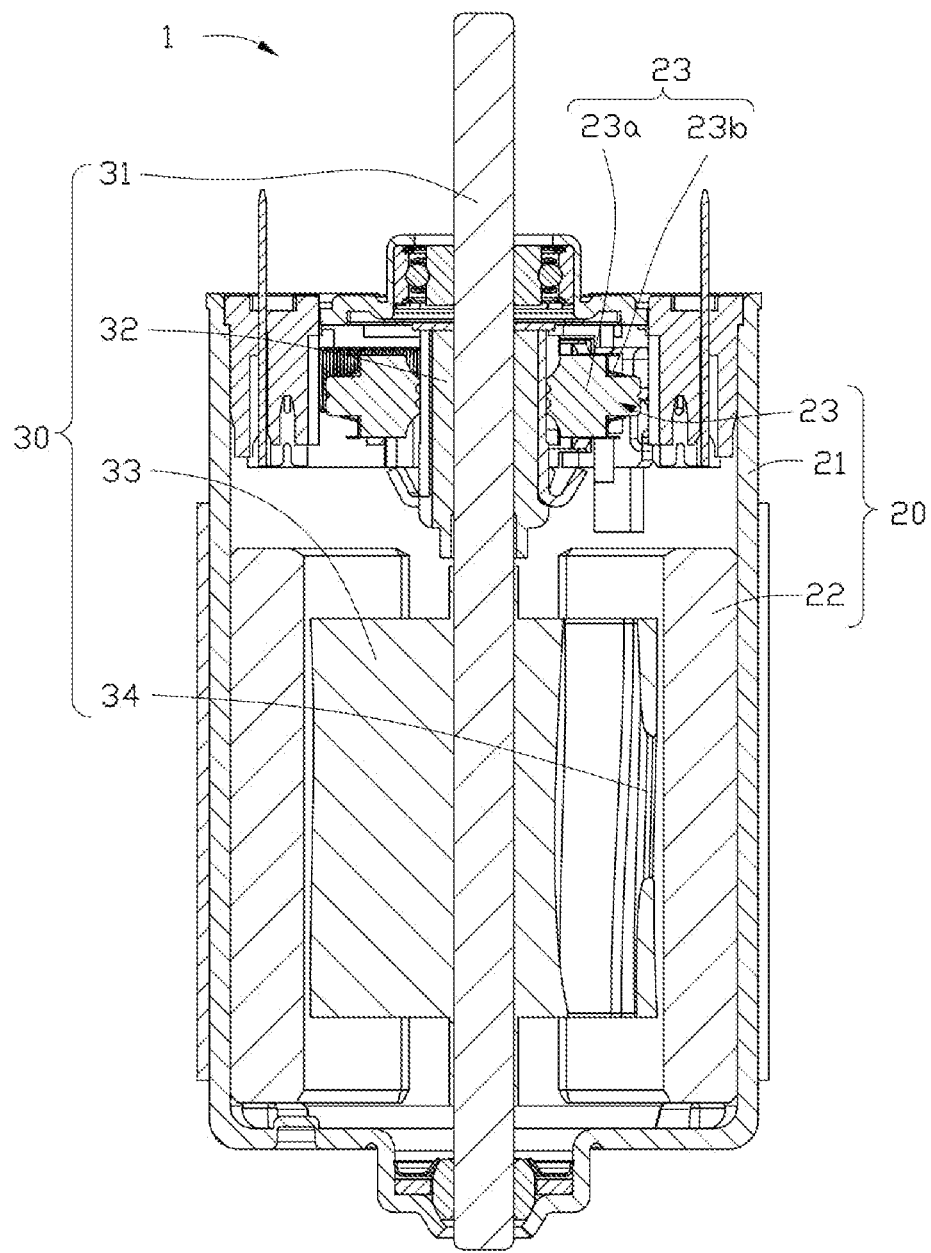
FIG. 1 is a cross sectional view of an electric motor according to an embodiment of the present disclosure.

FIG. 1 is a cross-sectional view of an electric motor 1 according to an embodiment of the present disclosure. In the embodiment, the electric motor 1 is a permanent magnet motor. The motor 1 may be applied in an electrical parking brake system. In other embodiments, the motor 1 may be applied in other systems. The motor 1 includes a stator 20 and a rotor 30 which is rotatable with respect to the stator 20. The stator 20 includes a housing 21, a number of permanent magnets 22 mounted to the inner surface of the housing 21 and an end cap 23 fixed to an open end of the housing 21. The rotor 30 is located inside of the stator 20. The end cap 23 of the stator 20 includes brushes 23a and brush arms 23b used for mounting the brushes 23a thereon. The rotor 30 includes a rotating shaft 31, a commutator 32 and a rotor core 33 mounted on the rotating shaft 31, and a winding 34 wound around the rotor core 33 and electrically connected with the commutator 32. The brushes 23a are used to slidably contact with the commutator 32 so as to supply power to the winding 34. The brush arms 23b are fixed to the end cap 23 and support the corresponding brushes 23a so that the brushes 23a slidably contact with the commutator 32 to achieve commutation.

Figure 2:
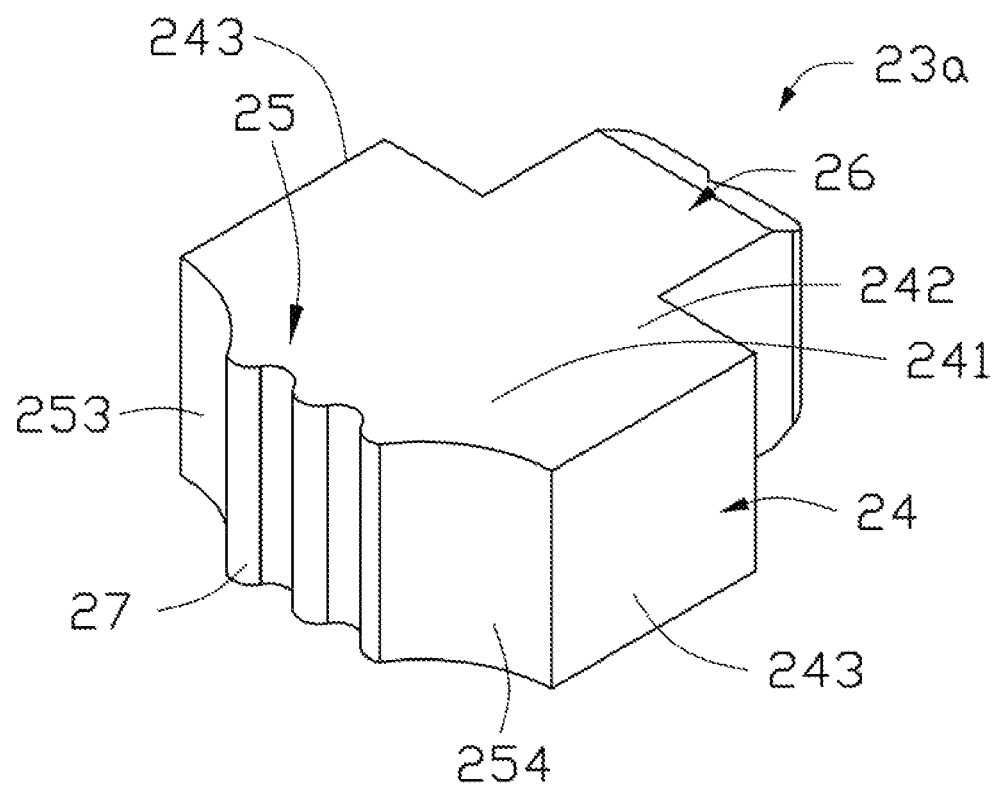
FIG. 2 is a perspecitve view of a brush according to an embodiment of the present disclosure.
Figure 3:
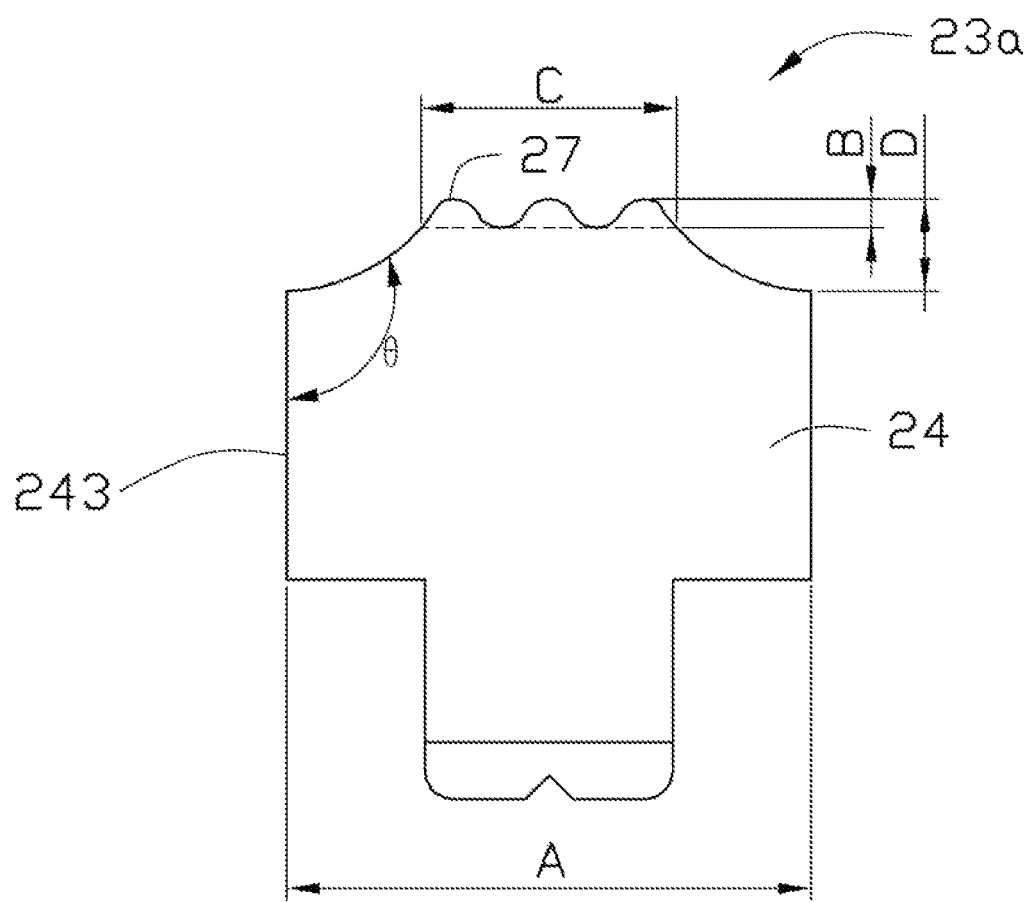
FIG. 3 is a top view of the brush of FIG. 2.

Refer to FIG. 2, each brush 23a includes a brush body 24, a protruding portion 25 projecting from a first end 241 of the brush body 24, and a connecting portion 26 projecting from a second end 242 of the brush body 24. The first end 241 of the brush body 24 is opposite to the second end 242 of the brush body 24. The brush body 24 includes two axial end faces 243 opposite to each other. The axial height of the brush body 24 in the axial direction of the commutator is represented by A (as shown in FIG. 3).

Figure 4:
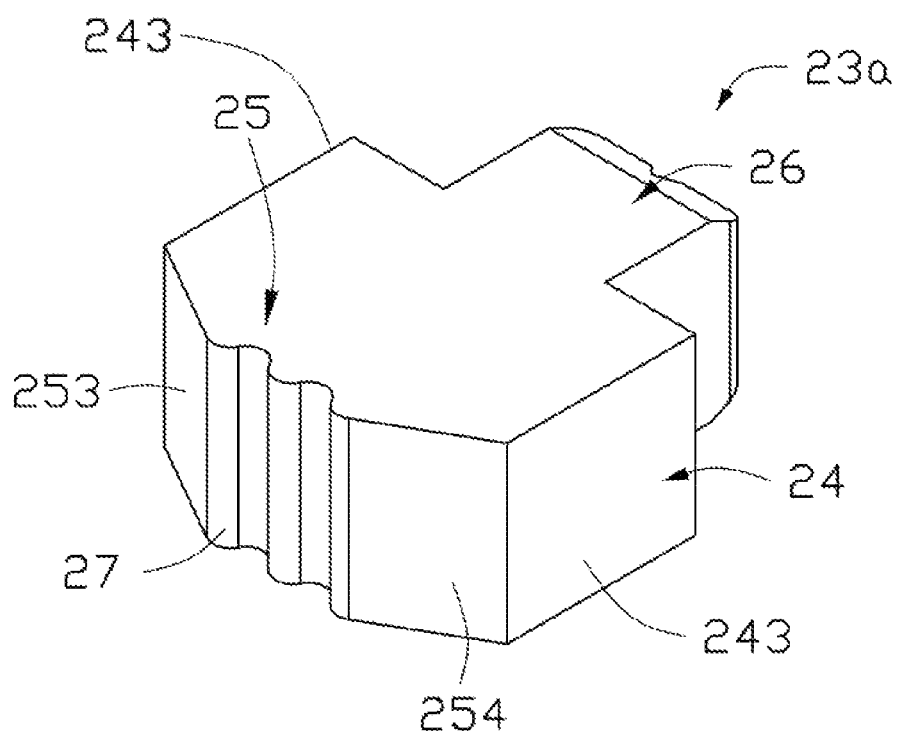
FIG. 4 is a perspecitve view of a brush according to an alternative embodiment of the present disclosure.
Figure 5:
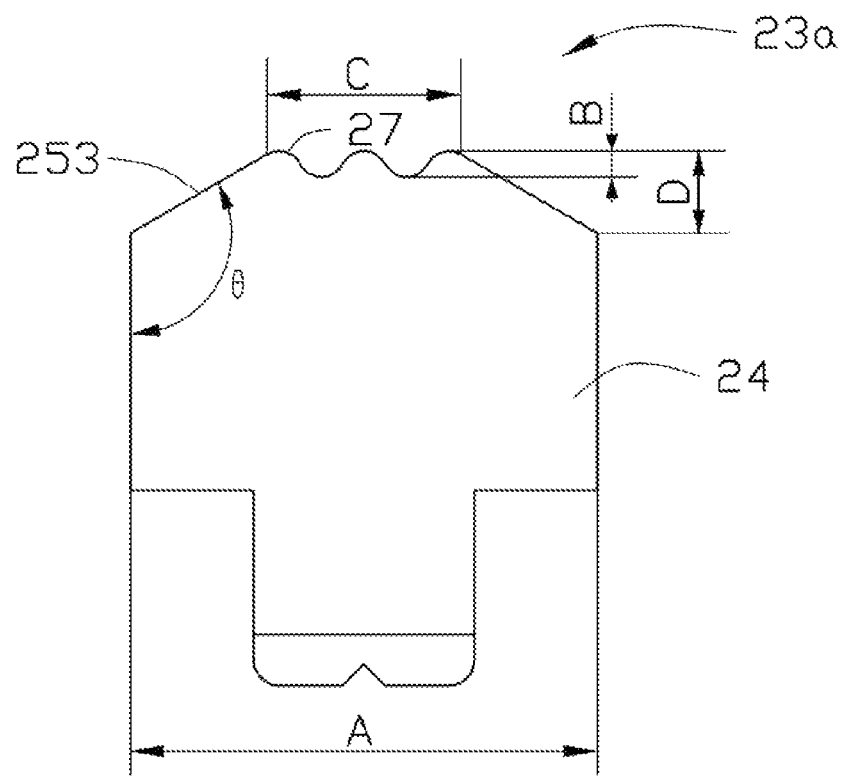
FIG. 5 is a top view of the brush of FIG. 4.

The protruding portion 25 is used to slidably contact with the commutator 32. The protruding portion 25 includes two opposing surfaces, i.e., the first surface 253 and the second surface 254. An angle θ is formed between each of the first and second surfaces 253, 254 and a corresponding adjacent end face 243. In one embodiment, the angle θ is an obtuse angle. In the present embodiment, the angle θ formed between the first surface 253 and the corresponding adjacent end face 243 is equal to the angle θ formed between the second surface 254 and the corresponding adjacent end face 243. In the present embodiment, the first surface 253 and the second surface 254 are respectively concave arc surfaces. In other embodiments, the first surface 253 and the second surface 254 may be planar surfaces (as shown in FIGS. 4 and 5) or convex surfaces.

The protruding portion 25 further includes at least two teeth 27. The at least two teeth 27 are located between the first surface 253 and the second surface 254. The at least two teeth 27 extend generally along the circumferential direction of the commutator 32. The at least two teeth 27 are parallel to each other. In the present embodiment, the teeth 27 are straight teeth. The tops and roots of the at least two teeth 27 may be rounded or sharp. The at least two parallel teeth 27 are used to slidably contact with the commutator 32. In one embodiment, the at least two teeth 27 are located at the middle of the protruding portion 25. In the embodiment, the protruding height of each tooth 27 is represented by B, the total axial width of the at least two teeth 27 in the axial direction of the brush is represented by C, and the protruding height of the protruding portion 25 with respect to the first end 241 is represented by D. In the embodiment, the number of the at least two teeth 27 is three. In other embodiments, the number of the at least two teeth 27 is not limited to three, for example, may be two, four, five, etc.

In the embodiment, the angle θ formed between the first/second surfaces 253/254 and the corresponding adjacent end face 243 is in the range of 110°-150°, for example the angle θ can be equal to 110°, 120°, 125° or 150°. The number of the at least two teeth 27 is in the range of 2-5, for example, may be 2, 3, 4 or 5. The ratio of the total axial width C of the at least two teeth 27 to the axial height A of the brush body 24 is in the range of 0.25-0.75. For example, the ratio of the total axial width C of the at least two teeth 27 to the axial height A of the brush body 24 may be equal to 0.25, 0.5, 0.55 or 0.75. The ratio of the protruding height B of each tooth 27 to the protruding height D of the protruding portion 25 is in the range of 0.15-0.6, for example, may be 0.15, 0.2, 0.3 or 0.6. When any one of the above mentioned conditions is satisfied, the noise generated due to the brush 23a sliding with respect to the commutator 32 will be reduced greatly. It should be noted that, in order to greatly reduce the noise generated by the brushes 23a and the commutator 32, the brushes 23a may satisfy any two of the above mentioned conditions, or any three of the above mentioned conditions, or all of the aforementioned four conditions, but are not limited to meet only one of the above mentioned conditions.

In the embodiment, the connecting portion 26 is fixedly connected with the brush arm 23b so that the brush arm 23b is capable of applying a pushing force to the connecting portion 26, and thus urging the brush 23a to slidably contact with the commutator 32.

When the motor 1 operates, the brushes 23a stays in a slidabe contact with the commutator 32. At the beginning, only the tops of the at least two teeth 27 contact with the commutator 32. Thus, the initial contact area between the brushes 23a and the commutator 32 are small, which effectively suppresses commutation spark and greatly reduces the noise generated due to the brushes 23a sliding with respect to the commutator 32. With continuous wearing between the the commutator 32 and the at least two teeth 27, the at least two teeth 27 are worn out and the first surface 253 and the second surface 254 of the protruding portion 25 start to contact with the commutator 32. The contact area between the brushes 23a and the commutator 32 increases gradually to avoid that the contact area between the brush 23a and the commutator 32 changes sharply, which is conducive to the reducing of noise.

Therefore, the technical solutions of embodiments of the present disclosure have been clearly and completely described above. Apparently, the described embodiments are merely part of, rather than all of, the embodiments of the present disclosure. A person skilled in the art may make various combinations of technical features in the various embodiments to meet practical needs. Based on the described embodiments of the present disclosure, any other embodiment obtained by a person skilled in the art without paying creative efforts shall also fall within the scope of the present disclosure.

The invention claimed is:

1. A brush configured to be in contact with a commutator, comprising:
   a brush body comprising two opposite axial end faces; and
   a protruding portion projecting from the brush body toward the commutator, the protruding portion comprising a first surface, a second surface and a plurality of teeth, the first surface and the second surface being respectively adjacent to the two axial end faces, angles formed between the first surface and the second surface and adjacent axial end faces corresponding thereto being obtuse, the plurality of teeth being located between the first surface and the second surface, and the plurality of teeth extending substantially along a circumferential direction of the commutator;
   wherein a ratio of a total width of all of the plurality of teeth in an axial direction of the brush to an axial height of the brush body is in the range of 0.25-0.75.

2. The brush of claim 1, wherein the angle formed between the first surface and the adjacent axial end face corresponding thereto is equal to the angel formed between the second surface and the adjacent axial end face corresponding thereto.

3. The brush of claim 1, wherein the angles formed between the first surface and the second surface and the adjacent axial end faces corresponding thereto are in the range of 110° ~150°.

4. The brush of claim 1, wherein a ratio of a protruding height of the teeth to a protruding height of the protruding portion is in the range of 0.15-0.6.

5. The brush of claim 1, wherein the number of the at least two teeth is in the range of 2-5.

6. The brush of claim 1, wherein each of the teeth has an arc-shaped top or a sharp top.

7. The brush of claim 1, wherein the teeth are straight teeth.

8. The brush of claim 1, wherein each of the first surface and the second surface is any one of a concave surface, a planar surface and a convex surface.

9. The brush of claim 1, wherein the brush body comprises a first end and a second end opposite to the first end, the brush further comprises a connecting portion, the protruding portion projects from the first end and the connecting portion projects from the second end.

10. An electric motor, comprising a housing, a commutator rotatably arranged in the housing, and a brush slidably contacting with the commutator, the brush comprising:
   a brush body comprising two opposite axial end faces; and
   a protruding portion projecting from the brush body toward the commutator, the protruding portion comprising a first surface, a second surface and plurality of teeth, the first surface and the second surface being respectively adjacent to the two axial end faces, angles formed between the first surface and the second surface and adjacent axial end faces corresponding thereto being obtuse, the plurality of teeth being located between the first surface and the second surface, and the plurality of teeth extending substantially along a circumferential direction of the commutator;
   wherein a ratio of a total width of all of the plurality of teeth in an axial direction of the brush to an axial height of the brush body is in the range of 0.25-0.75.

11. The electric motor of claim 10, further comprising a brush arm, wherein the brush is mounted to the brush arm.

* * * * *